US 8,839,127 B2

(12) United States Patent
Louch et al.

(10) Patent No.: US 8,839,127 B2
(45) Date of Patent: *Sep. 16, 2014

(54) OBJECT TRANSITIONS

(75) Inventors: John O. Louch, San Luis Obispo, CA (US); Imran A. Chaudhri, San Francisco, CA (US); Christopher Hynes, Santa Cruz, CA (US); Timothy Wayne Bumgarner, Sharpsburg, MD (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/399,978

(22) Filed: Feb. 17, 2012

(65) Prior Publication Data

US 2012/0278753 A1    Nov. 1, 2012

Related U.S. Application Data

(63) Continuation of application No. 11/760,561, filed on Jun. 8, 2007, now Pat. No. 8,127,239.

(51) Int. Cl.
*G06F 3/048*      (2013.01)
*G09G 5/00*       (2006.01)
*G06T 13/00*      (2011.01)
*G06T 15/00*      (2011.01)

(52) U.S. Cl.
USPC ........... 715/764; 715/771; 715/838; 715/781; 715/810; 345/473; 345/419; 345/660; 345/664

(58) Field of Classification Search
USPC .......... 715/764, 771, 838, 781, 810; 345/473, 345/419, 660, 664
See application file for complete search history.

(56) References Cited

U.S. PATENT DOCUMENTS

| | | | |
|---|---|---|---|
| 5,483,261 A | 1/1996 | Yasutake |
| 5,488,204 A | 1/1996 | Mead et al. |
| 5,544,295 A | 8/1996 | Capps |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,432,928 B2 | 10/2008 | Shaw et al. |
| 7,663,607 B2 | 2/2010 | Hotelling et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Ting Lee
(74) *Attorney, Agent, or Firm* — Morrison & Foerster LLP

(57) ABSTRACT

Object transitions can include providing a graphical transition of an object item that retains an aspect ratio associated with the object item while transitioning the object item into an instance of an executing object associated with the object item.

14 Claims, 13 Drawing Sheets

(56) References Cited

U.S. PATENT DOCUMENTS

| | | |
|---|---|---|
| 8,127,239 B2 | 2/2012 | Louch et al. |
| 2003/0076352 A1 | 4/2003 | Uhlig et al. |
| 2003/0169298 A1 | 9/2003 | Ording |
| 2005/0010876 A1 | 1/2005 | Robertson et al. |
| 2005/0138569 A1 | 6/2005 | Baxter et al. |
| 2006/0026521 A1 | 2/2006 | Hotelling et al. |
| 2006/0197753 A1 | 9/2006 | Hotelling |
| 2006/0248471 A1 | 11/2006 | Lindsay et al. |
| 2006/0282786 A1 | 12/2006 | Shaw et al. |
| 2007/0016853 A1 | 1/2007 | Abagyan et al. |
| 2007/0255963 A1 | 11/2007 | Pizano et al. |
| 2008/0052637 A1 | 2/2008 | Ben-Yoseph et al. |
| 2008/0282140 A1 | 11/2008 | Ioffe |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

OBJECT TRANSITIONS

CROSS-REFERENCE TO RELATED APPLICATIONS

This application is a continuation of U.S. patent application Ser. No. 11/760,561, filed on Jun. 8, 2007, the entire contents of which are hereby incorporated by reference.

BACKGROUND

This disclosure relates to accessing and/or activating objects on a device.

A graphical user interface allows a large number of graphical objects or items to be displayed on a display screen at the same time. Leading personal computer operating systems, such as Apple Mac OS® (available from Apple Computers, Inc. of Cupertino, Calif.), provide user interfaces in which a number of graphical representations of system objects, such as windows, visualization objects representative of files, widgets, hyperlinks, peripherals, applications, and other representations of system objects can be displayed according to the interactions of the user. Taskbars, menus, virtual buttons, a mouse, a keyboard, and other user interface elements provide mechanisms for accessing and/or activating the system objects corresponding to the displayed representations.

The graphical objects and access to the corresponding system objects and related functions, however, should be presented in a manner that facilitates an intuitive user experience. The use of metaphors that represent concrete, familiar ideas facilitates such an intuitive user experience. For example, the metaphor of file folders can be used for storing documents; the metaphor of a file cabinet can be used for storing information on a hard disk; and the metaphor of the desktop can be used for an operating system interface.

As the capabilities of processing devices progress, however, so to do the demands on the graphical user interface to convey information to the users in an intuitive manner.

SUMMARY

In one aspect, systems, methods, apparatuses and computer program products are provided. In one aspect, one or more computer readable media are disclosed, which store executable instructions causing a processor to perform operations comprising: providing a display environment including one or more object items; receiving a user selection of at least one of the object items; and, graphically transitioning the object item into an instance of an executing object within the display environment while retaining an aspect ratio associated with the object item In another aspect, an operating system for a computing device is disclosed. The operating system can include a display environment engine, an interface engine and a transition engine. The display environment engine can generate a display environment for a user, including one or more object items disposed within the display environment. The interface engine can receive input from the user including a selection of an object item from the display environment. The transition engine can provide a graphical transition of the selected object item to an instance of an executing object associated with the selected object item, the transition retaining the aspect ratio of the object item through one or more successive transition states between a first transition state and a final transition state.

Systems and methods as described can facilitate access to objects (e.g., applications, content, etc.) stored on a data store.

The media systems and methods can also: help to provide a link between a selected object item and an instance of the object resulting from the selection and, provide a user with a graphic between the period when the user selects an object item and when the object is ready to use.

DETAILED DESCRIPTION

Figure 1:
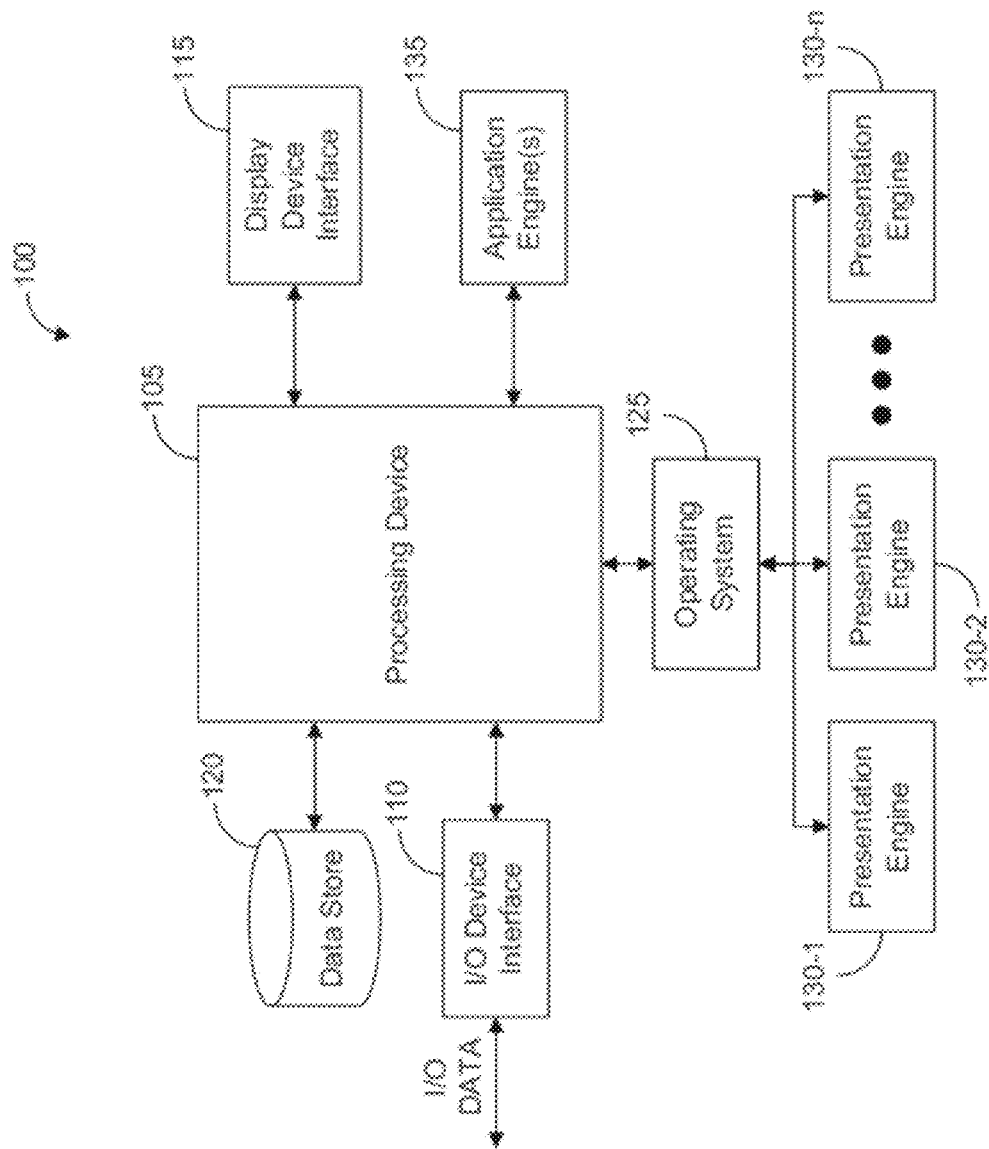
FIG. 1 is a block diagram of an example device having an object transition.

FIG. 1 is a block diagram of an exemplary device 100 having an object transition. In other examples, device 100 can be implemented in a phone, a game console, a PDA, an iPod® (available from Apple Inc. of Cupertino, Calif.), or any other electronic device operable to provide a graphical user interface for the selection and/or execution of object items (e.g., icons, applications, hyperlinks, etc.).

The device 100 includes a processing device 105. The processing device 105 can be configured to execute an ordered list of instructions (e.g., program engine(s)) to provide an output to an I/O device using an I/O device interface 110 or to a display device (not shown) using a display device interface 115. The ordered list of instructions can be stored in a system data store 120. System data store 120, in some examples, can include volatile and/or non volatile storage.

The device 100 can include an operating system 125. The operating system 125 can be configured to provide a graphical user interface to a user. In one implementation, the functionality of the operating system 125 can be distributed across several engines. For example, the operating system 125 can include one or more presentation engines 130-1, 130-2, and 130-n. The device 100 can also include one or more application engines 135 which are generated based upon a user selecting an application item associated with that application. The engines may be implemented in software as software modules or instructions, or may be implemented in hardware, or in a combination of software and hardware. The software can be stored in a data store (e.g., data store 120, flash memory, external memory, read-only memory (ROM), nominally powered volatile memory, etc.) during periods in which the device 100 is in a standby or power-down mode. Upon power up, the software is communicated to the processing device 105. The processing device 105 then executes the software by performing the commands implicated by the software.

One or more of the presentation engines 130-1, 130-2 and 130-n can be configured to provide a user interface (e.g., a graphical user interface) to the display device interface 115 to produce a display environment. Furthermore, one or more of the presentations engines 130-1, 130-2 and 130-n can be configured to provide one or more application items associated with an application and/or document items associated with a document or file to be represented within the display environment. Moreover, one or more of the presentation engines 130-1, 130-2 and 130-n can be configured to provide a dock representation within the display environment. One or more of the presentation engines 130-1, 130-2 and 130-n can be further configured to provide a transition between an application item and an application instance representation managed by the application engine 135 through an interface with the operating system 125.

The device 100 of FIG. 1 can also implement different functional distribution architectures that have additional functional blocks or fewer functional blocks. For example, a desktop presentation engine and a dock presentation engine can be implemented in a single presentation engine or functional block. In other examples, all of the engines can be implemented in a single monolithic functional block.

Figure 2:
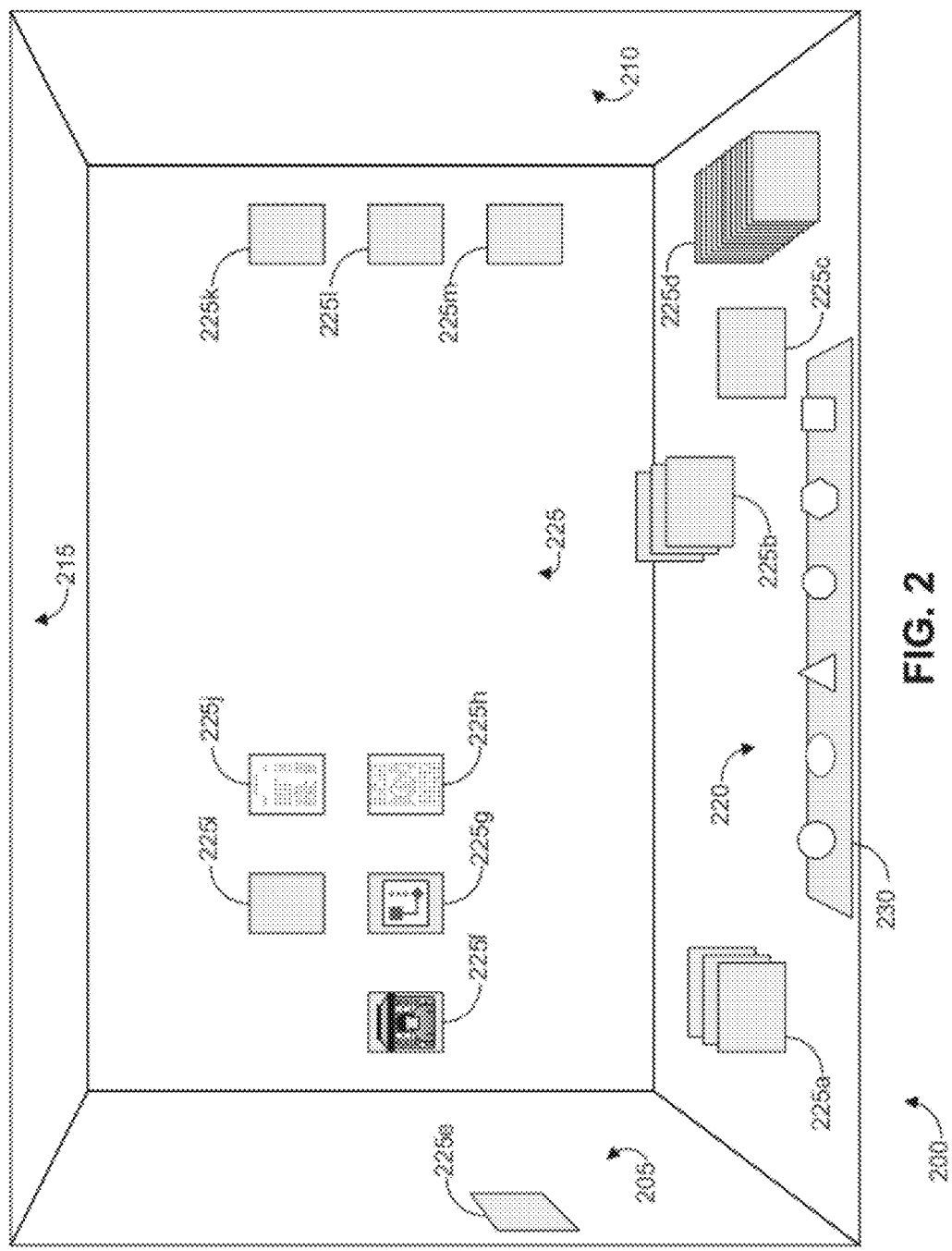
FIG. 2 is a screen shot illustrating an example of a three-dimensional user interface for a computing device.

FIG. 2 is a screen shot illustrating an example of a display environment 200 (e.g., a multi-dimensional desktop) for a device, such as device 100. In some implementations, the multidimensional desktop 200 can include visualization objects, a visualization object receptacle, and stack items. An example implementation of a visualization object receptacle 300 is the "Dock" user interface (e.g., dock 230) in the MAC OS® X Leopard operating system. Other implementations can also be used. In some implementations, the visualization objects, the visualization object receptacle and the stack items can be presented in a pseudo-three dimensional (i.e., "2.5D") or a three-dimensional environment as graphical objects having a depth aspect.

The three-dimensional user interface 200, in some examples, can include two side wall representations 205, 210, a ceiling representation 215, a floor (or desk) representation 220, and a back-wall representation 222. Similarly to a real-life workspace which enables the user to store documents or files on his/her desk, the three-dimensional user interface 200 can enable a user to place application items (e.g., visualization objects, visualization object receptacle, and stacked items such as, e.g., document representations, file representations, etc.) on a desk representation 220. Moreover, the application items can be arranged in a stacked item representation 225a, 225b, 225d of varying sizes or as a single item representation 225c. In some implementations, stacked item representations or object representations can be presented in a perspective view based on where the stacked item representation or object representation was situated within the environment.

Application items 225e-m can also be linked to the side wall representations 205, 210 and/or the back-wall representation 225 to provide a similar appearance to a paper being thumbtacked to a bulletin board. The application items 225e-m can include visualization objects which represent a particular application associated with a file (e.g., a text document, picture file, movie file, music file, drawing file, etc.). The icons can include a picture (e.g., a bitmap file, or some other media or multimedia file, html, etc.) associated with the application and/or the file. The picture can include an aspect ratio which defines the relative ratio of the height and width (e.g., height v. width, width v. height) of the picture. In some implementations, the icons include a small representation of the actual content of the file itself. For example, an icon could include a small version of, for example, a picture that the file contains, a document file icon could include a small version of the text that the file contains, a drawing file could include a small version of one or more of the drawings included in the file, or a video file could include at least a portion of the video content associated with the file.

The device 100 can receive a selection of one or more of the application items 225c, 225e-m, for example, from an input device (e.g., a mouse) operated by a user. Alternatively, the device 100 can receive a selection of a stack 225a, 225b, 225d, and communicate with a user to determine which application item from the stack is selected. Upon receipt of a selection of an application item from the display environment 200, the operating system 125 can retrieve an application associated with the selected application item and instruct a processing device 105 to begin executing the application. The operating system 125 can also transition the display environment to include an application instance representation. The transition of the application item into the application instance representation can include, for example, copying the application item and increasing the size of the copied application item until the copied application item has reached a predefined size (e.g., application instance representation size). The application instance representation can be controlled by the execution of an application engine 130 through the operating system 125.

In some implementations, the transition could include a cross fading transition. During the cross fading transition the system may represent an object using a generic object item. After the selection of the generic object item the generic object item could be increased in size until the generic object items has reached a predetermined threshold. Upon reaching the predetermined size, the generic object item could fade away, while an executing instance of the object could take place of the generic object item and complete the transition into an executing instance of the object item.

In further implementations, the transition could include a minimization of the instance of the executing object. The minimization could transition the instance of the executing object into an object item residing in an object receptacle, or into the object item in the display environment from which the object instance was launched. When the object instance is minimized into an object receptacle or into an object item, the object receptacle or object item could be highlighted to provide notification that an object associated with the object receptacle or the object item is currently running. In some implementations, the highlight could include a halo around the object item. In other implementations, a notation could be made near the object item indicating, for example, a number of instances currently executing. Other highlights providing notification of an executing object are possible.

Figure 3A:
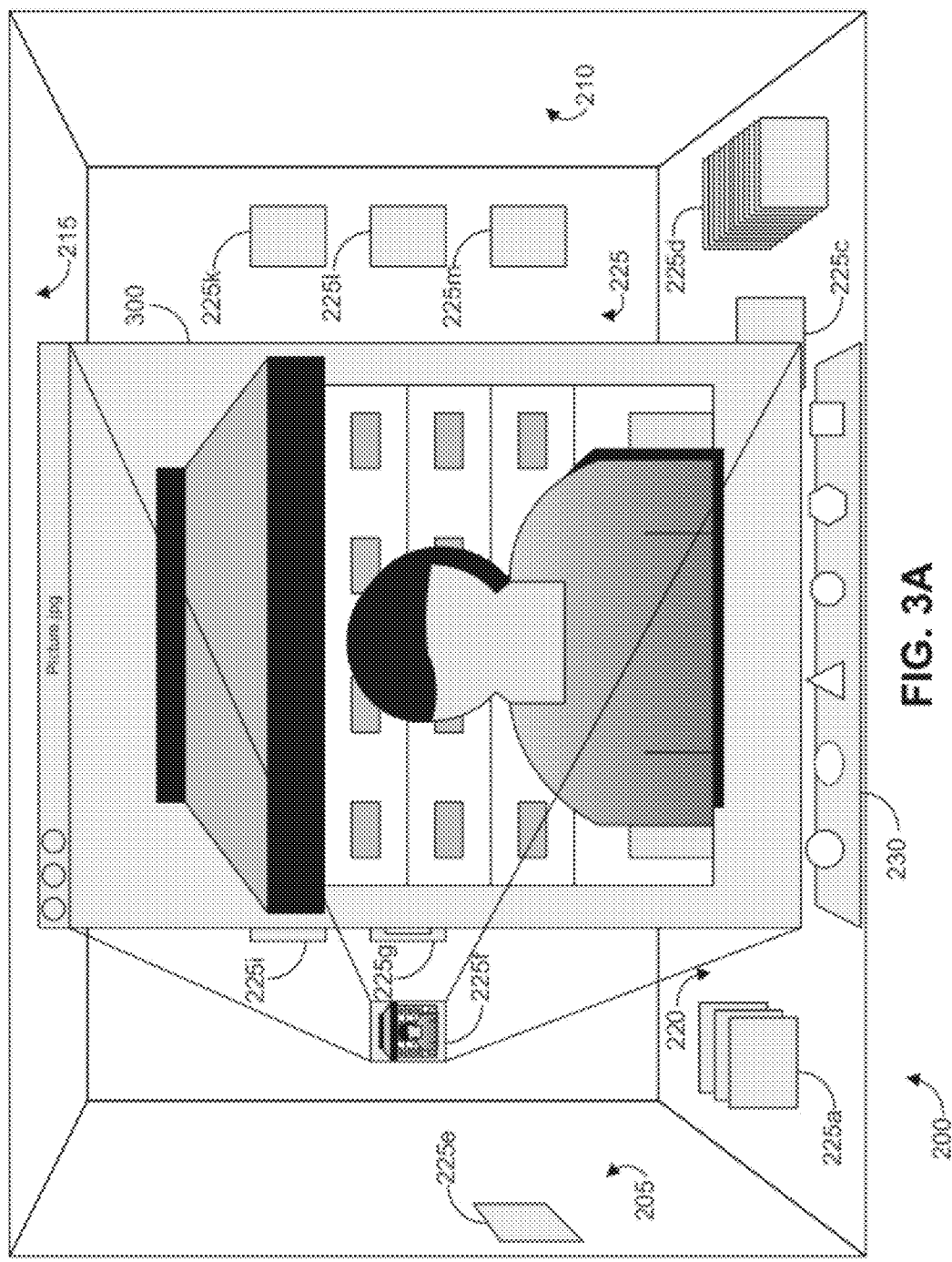
FIG. 3A is a screen shot illustrating an example of a display environment having an object transition.

FIG. 3A is a screen shot illustrating an example of display environment 200 depicting an object transition (e.g., an application transition). As discussed above, upon selection of an application item 225f, an operating system 125 can retrieve an application associated with the application item 225f from a data store 120 and instruct the processing device 105 (e.g., a digital processor) to begin executing the application. If there is a file associated with the selected application, the operating system can view the contents of the file and scale the contents to the size of the application item. During successive refreshes of the display device, the scale of the viewed application item can be increased at a predefined rate until the application item has reached a predefined size. In some examples, the predefined rate and predefined size can be adjusted by the user, while in other examples one or more of the predefined rate or the predefined size is a constant defined by the operating system. When the scaled view of the application item reaches the predefined size, the scaled view of the application item is replaced by an application instance representation 300.

As shown in FIG. 3A, the application item is a scaled version of a representation of the file. However, it should be understood that in various examples, the application item is a generic icon associated with programs of that type. Moreover, in some implementations a selected application item can be for a application itself (as opposed to a file with an application association), the generic icon itself, for example, can be copied and successively scaled at a predefined rate until the scaled copy of the icon reaches a predefined size. The scaled copy of the icon can then be replaced by a generic application instance representation (e.g., a blank document or template). In other implementations, when a selected application item is for an application itself, there might be no transition between selection of the application item and presentation of the application instance representation 300.

Figure 3B:
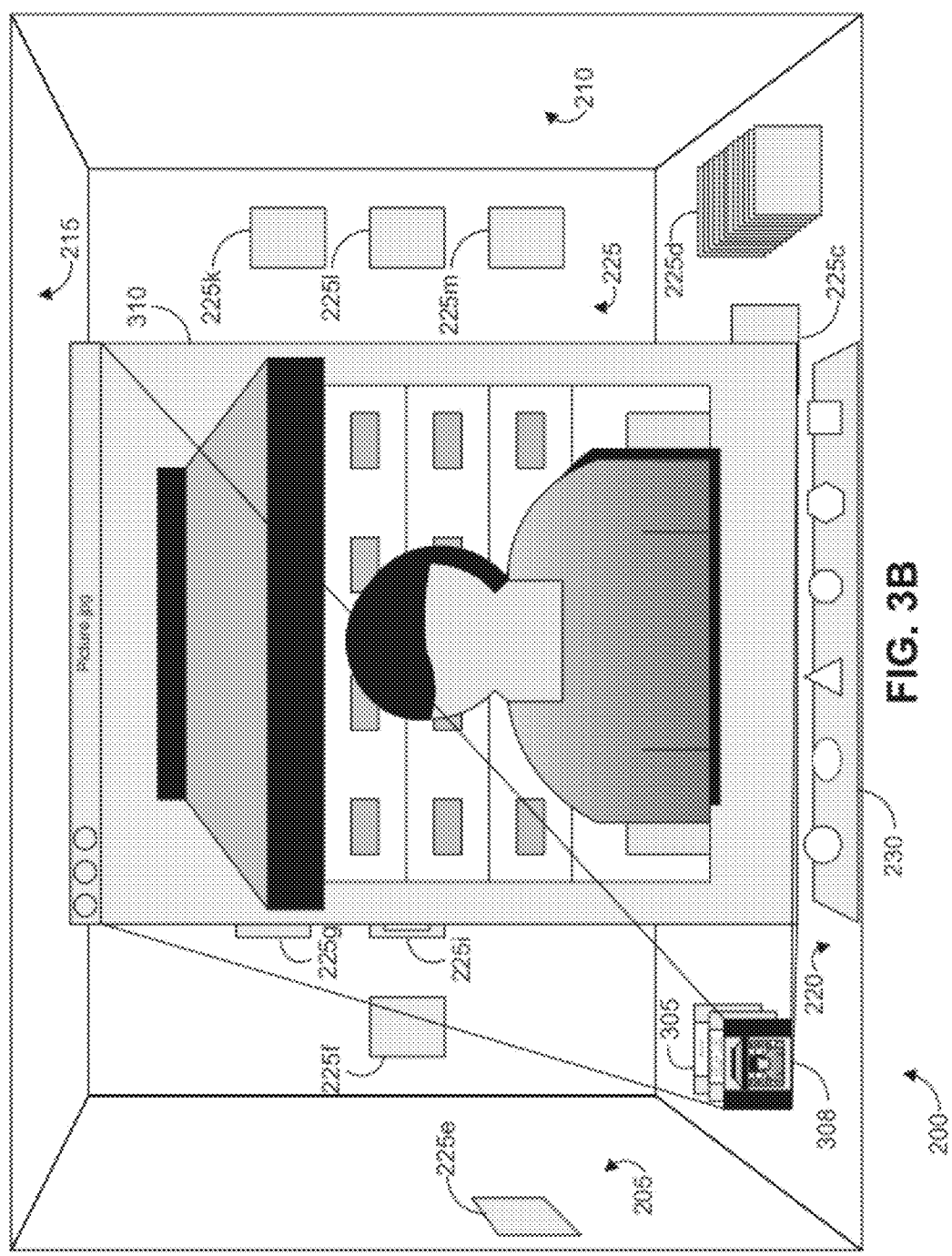
FIG. 3B is a screen shot illustrating an example of a display environment having an object transition from a stack representation.

FIG. 3B is a screen shot illustrating an example of a display environment having an object transition from a stack representation. In some implementations, stacked items representation 305 can enable the user to initiate an object transition (e.g., launch an application item). In such implementations, the user can select the stacked items representation 305 using, for example, an I/O device (e.g., keyboard, mouse, microphone, etc.). Upon selection of the stacked items representation 305, an operating system 125 can retrieve an application associated with an application item 308 from a data store 120 and instruct the processing device 105 (e.g., a digital processor) to begin executing the application associated with the application item. If there is a file associated with the selected application, the operating system can provide a view of the contents of the file and scale the view of contents to the size of the initial application item. During successive refreshes of the display device, the scale of the viewed application item can be increased at a predefined rate until the application item has reached a predefined size. In some examples, the predefined rate and predefined size can be adjusted by the user, while in other examples one or more of the predefined rate or the predefined size is a constant defined, for example, by the operating system. In some implementations, when the scaled view of the application item reaches the predefined size, the scaled view of the application item can be replaced by an application instance representation 310. In some implementations, the application item can be removed when the application item is being viewed, such that the document itself appears to zoom into the foreground rather than remain on the desktop. In other implementations, the application item 308 can be marked, thereby indicating which application item (e.g., application item 308) the user is viewing.

In the implementation shown in FIG. 3B, the top application item 308 in the stacked items representation 305 is depicted as being selected based on the selection of the stacked items representation 305. However, the selection of the stacked items representation 305 in other implementations can be configured to provide for the selection of each of the application items in the stacked items representation 305. In such implementations, selection of the stacked items representation thereby causes the transition of each of the application items in the stacked items representation 305 to begin to execute and transition into the foreground. The transition of multiple application items into the foreground can occur successively or staggered, for example. The order of the transitions, for example, can be based on an order associated with the application items in the stacked items representation 305. In some implementations, multiple application items being selected for simultaneous execution can cause the application items to open in a layered format (e.g., one window behind another). In other implementations, the selection of multiple application items for simultaneous execution can cause multiple drawers to be added to an application or display environment. In some implementations, the applications items can be transitioned into the foreground, and then transitioned into a drawer or into the background by one of the other application items in the stack items representation 305. Other arrangements for displaying multiple object transitions are possible.

Figure 3C:
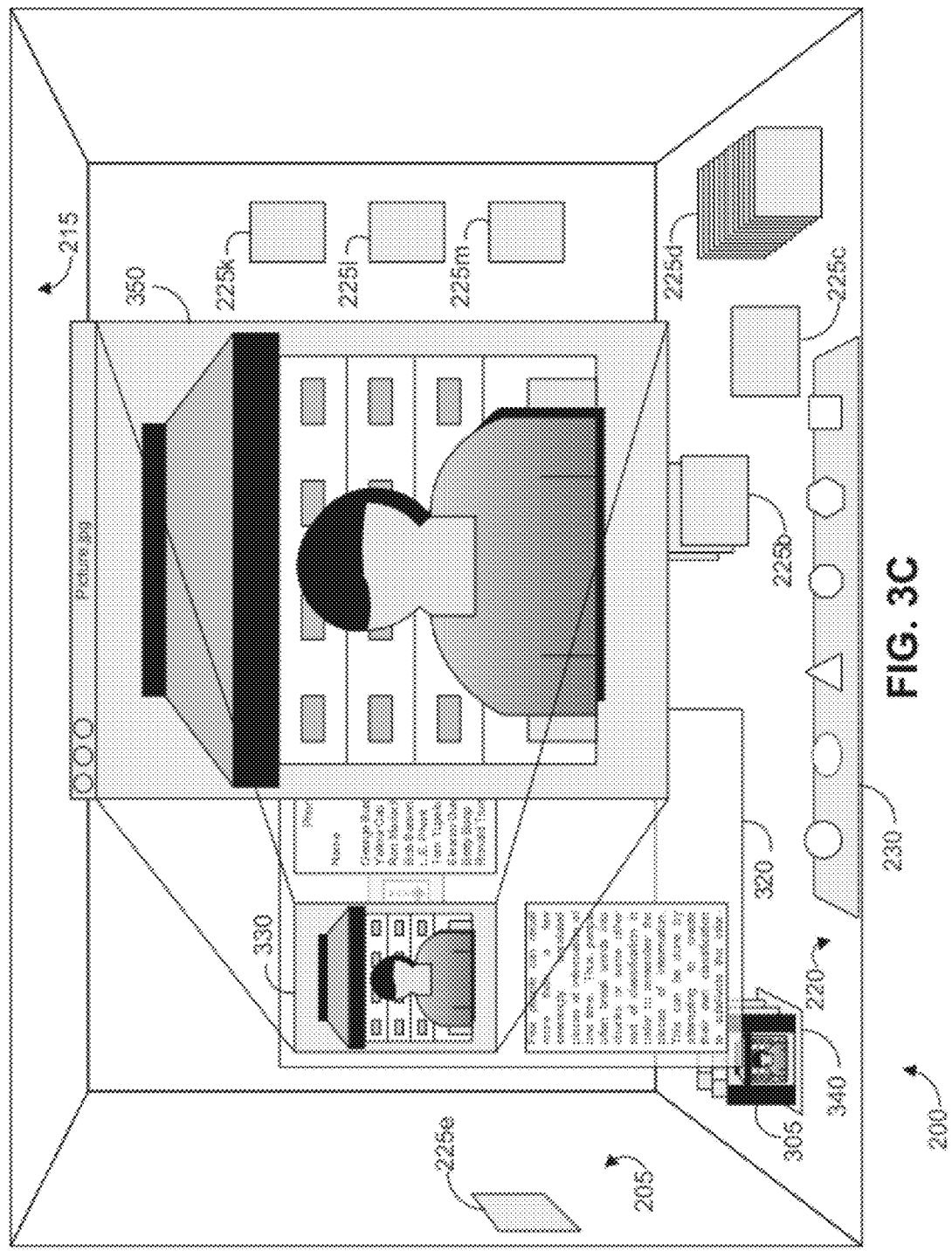
FIG. 3C is a screen shot illustrating another example of a display environment having an object transition from a stack representation.

FIG. 3C is a screen shot illustrating another example of a display environment having an object transition from a stack representation. In some implementations, selection of a stacked items representation 305 can cause the display environment to present an stacked items matrix representation 320 including scaled representations of the application items 330 in the stack. The selected stacked items representation 305, in some implementations, can include an indication 340 of which stacked items representation (e.g., stacked items representation 305) is selected. The indication 340 can include a highlight (e.g., a glow feature) around, for example, the bottom of the stacked items representation. Other indications for selected stacked items representations or selected application items are possible.

In some implementations, the user can select a scaled representation of the application item 330 from the stacked items matrix representation 320 using, for example, an I/O device (e.g., keyboard, mouse, microphone, etc). Upon selection of the application item 330 from the matrix representation 320, an operating system 125 can retrieve an application associated with the selected application item 330 from a data store 120 and instruct the processing device 105 (e.g., a digital processor) to begin executing the application associated with the application item. In some implementations, after selection of an application item is made, the matrix representation is removed. If there is a file associated with the selected application, the operating system can provide a view the contents of the file and scale the view of contents to the size of the initial application item.

During successive refreshes of the display device, the scale of the viewed application item can be increased at a predefined rate until the application item has reached a predefined size. In some examples, the predefined rate and predefined size can be adjusted by the user, while in other examples one or more of the predefined rate or the predefined size is a constant defined, for example, by the operating system. In some implementations, when the scaled view of the application item reaches the predefined size, the scaled view of the application item can be replaced by an application instance representation 350.

Figure 3D:
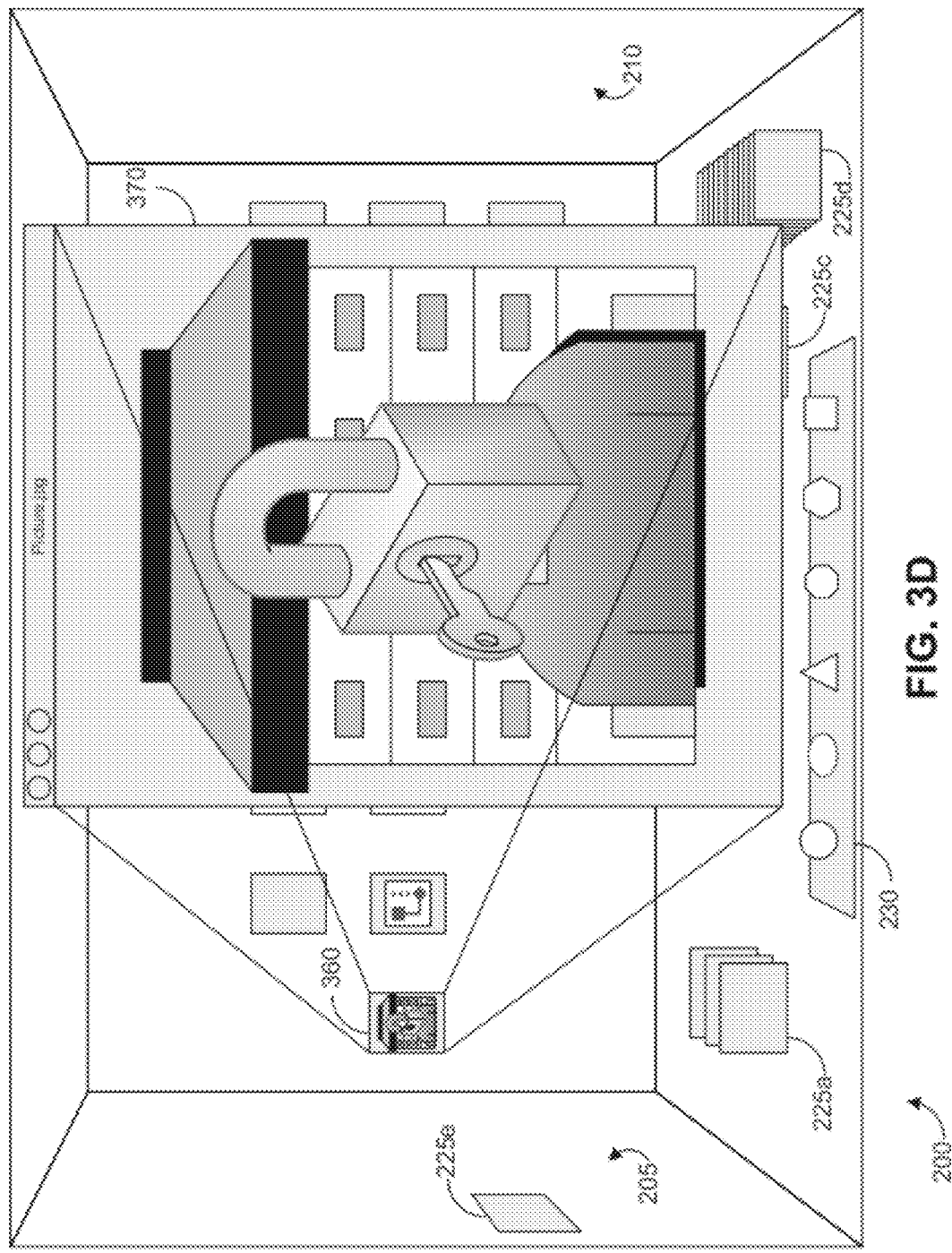
FIG. 3D is a screen shot illustrating an example of a display environment having an object transition accompanied by an animation.

FIG. 3D is a screen shot illustrating an example of a display environment having an object transition accompanied by an animation. In some implementations, there can be transformations associated with accessing an application item. For example, the application item could be encrypted for security. In other examples, the application item might conform to a standard not supported by the device in its native format. In such examples, an application item 360, in some implementations, can include an indication that the contents associated with the application item will be transformed prior to display. In the example of FIG. 3D, the application item 360 is encrypted and can include, for example, a lock representation overlaying the application item 360. In other implementations, the computing device may be instructed to convert the contents to another format (e.g., from a plain text formatted file to a portable document format (PDF) file). In such implementations, there might be no representation overlaying or otherwise designating the application item 360 (e.g., as secured).

Upon selection of the application item 360 indicating an instantiation request an operating system 125 can retrieve an application associated with the selected application item 360 from a data store 120 and instruct the processing device 105 (e.g., a digital processor) to begin executing the application associated with the application item. If there is a file associated with the selected application, the operating system can provide a view the contents of the file and scale the view of contents to the size of the initial application item. Furthermore, the operating system can provide a scaled animation of the transformation being performed on the file contents. For example, in FIG. 3D an animation can present the lock representation being unlocked by a key representation.

During successive refreshes of the display device, the scale of the viewed application item and scale of the animation can be increased at a predefined rate until the application item and animation have reached a predefined size. In some examples, the predefined rate and predefined size can be adjusted by the user, while in other examples one or more of the predefined rate or the predefined size is a constant defined by the operating system. In some implementations, when the scaled view of the application item and the animation reaches the predefined size, the scaled view of the application item and animation can be replaced by an application instance representation 370. In some implementations, the animations can be tailored to the type of action being performed. Other animations are possible (e.g., a meat grinder for converting files, a wrench, a puzzle, etc.).

In any of the implementations described herein, an operating system (e.g., operating system 125 of FIG. 1) can work in conjunction with the application to animate the transition. In some implementations, the operating system can control the opening of the application and animate the opening of the application. At some point during this process, the operating system can surrender control of the transition and/or animation process to the application. In some implementations, an application program interface (API) or other type of program code can be used to ensure that the handoff between the operating system and the application is seamless. In such implementations, the API, for example, can include the ability to provide the operating system with control of the transition to some point at which the application can be given control. In some implementations, the point at which the application can be given control can be based on the application associated with the transition.

Figure 3E:
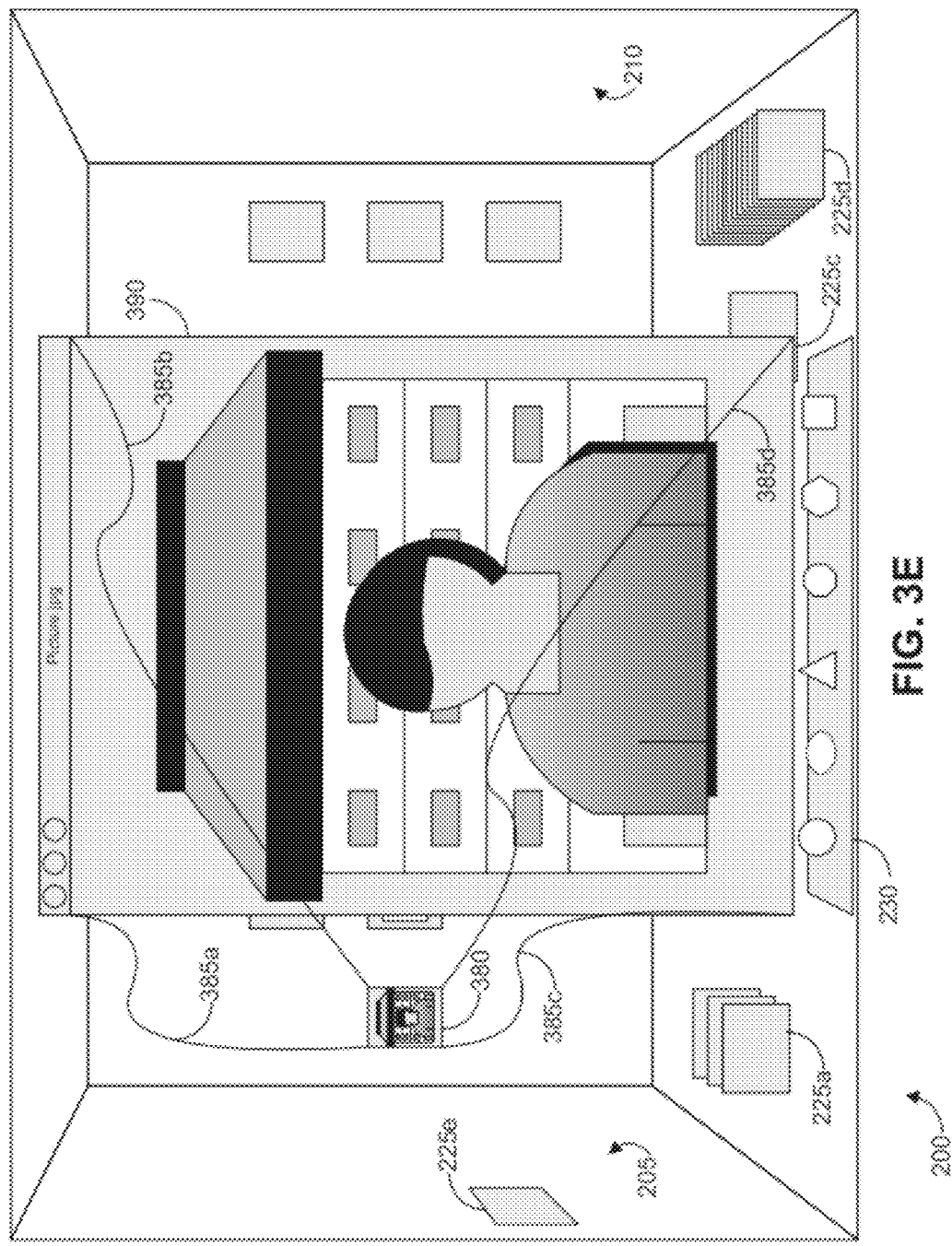
FIG. 3E is a screen shot illustrating an example of a display environment having an arched object transition.

FIG. 3E is a screen shot illustrating an example of a display environment having an arched object transition. An arched transition path can operate to draw user interest to the object transition, thereby strengthening the link between an object item representation and an executing instance of the object. In some implementations, the graphical representation of an object (e.g., graphical representations 380) can transition along a plurality of arched paths 385*a-d*. Other transition paths are possible.

Figure 4:
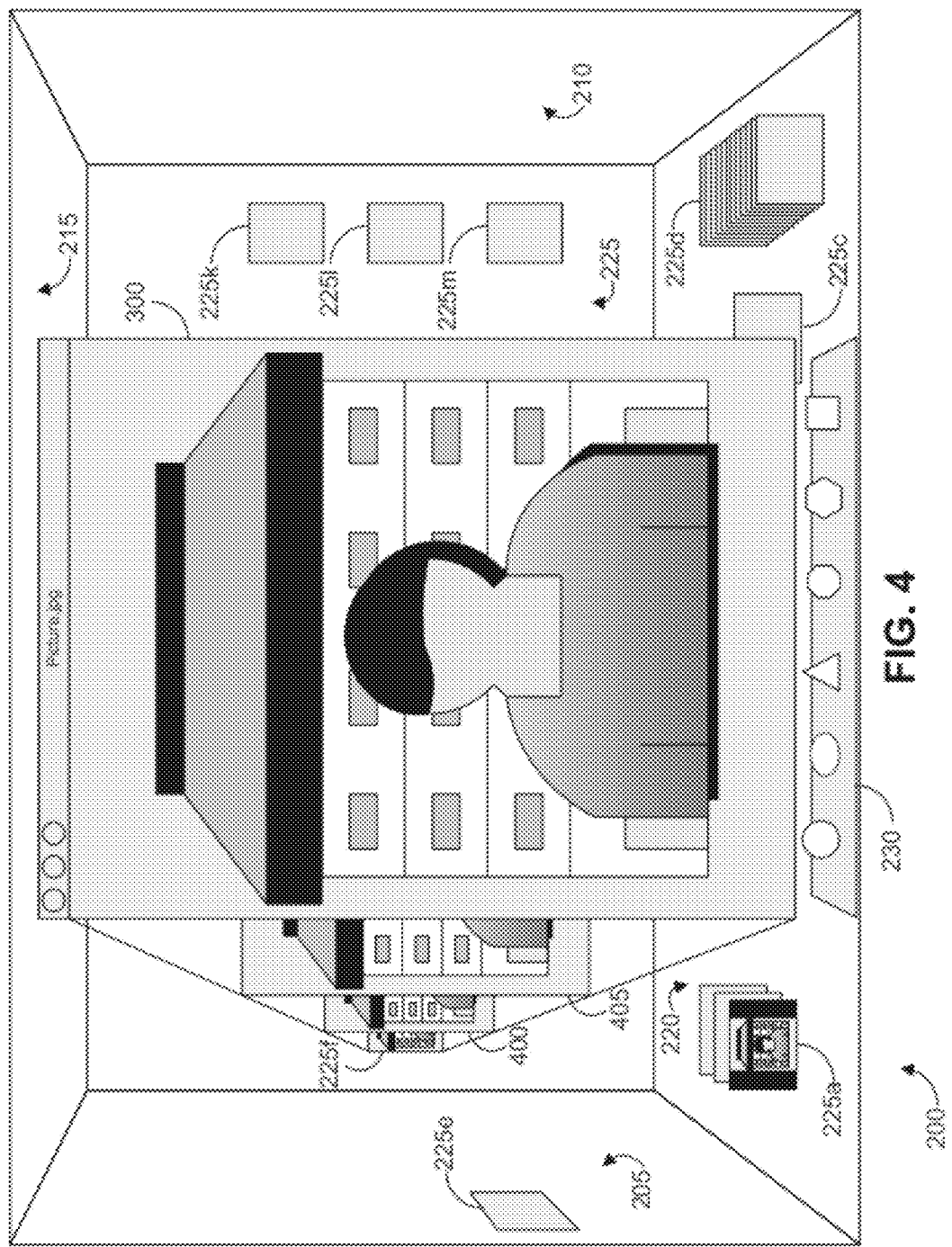
FIG. 4 is a screen shot illustrating another example of a display environment having an object transition.

FIG. 4 is a screen shot illustrating another example of a display environment having an improved application transition. In FIG. 4 an example of sequential scaling of the file associated with the application item can be observed. Upon selection of application item 225*f*, the operating system 125 can retrieve an application associated with the selected application item 225*f* and instruct the processing device 105 to begin executing the application.

The operating system 125 can also copy the application item (e.g., the file contents or an icon associated with the selected application item 225*f*) and scale the copied application item 225*f* to a first scaled application item 400. On a succeeding display refresh, the operating system 125 can remove the first scaled application item 400 and draw a second scaled application item 405. Accordingly, on a next succeeding display refresh, the operating system 125 can remove the second scaled application item 405 and draw an application instance representation 300.

In some implementations, a number of intermediate scaled application items 400, 405 can be varied to provide a faster or slower transition to the application instance representation 300. For example, if a slower transition to the application instance representation is requested, more intermediate scaled application items 400, 405 can be inserted into the transition. If a faster transition to the application instance representation is requested, fewer intermediate scaled application items 400, 405 can be inserted into the transition. In any of the implementations described herein, motion blur between successive scaled application items can be used to enhance the appearance of motion between states. In some examples, the rate of the transition can alternatively (or additionally) be controlled by lengthening or shortening the time between the refresh of the first scaled application items 400 and the second scaled application 405, and lengthening or shortening the time between refresh of the scaled application items 405 and the application instance representation 300. Moreover, motion blur can be used in some implementations to reduce computational power required to scale the application item, thereby enabling the same rate of transition using fewer intermediate states. In other implementations, a total time for the transition can be programmed into an operating system or can be specified by a user. The number of intermediate states can then be adjusted to the time allotted for the transition.

Furthermore, while the application item transition has been described above as being performed by an operating system 125, the transition can also be provided by an application itself in conjunction with any of the examples disclosed. For example, the application can provide successively larger instances of the application to the device 100 for display to the user. In other examples, the application can provide the device with a defined transition programmed into the application.

Some applications, for example, include different representations based on the size of the application. In such examples, an implementation of the system can choose which of multiple representations are best for display. The system can then display the representation which works the best based on the size of the application during the transition.

Figure 5:
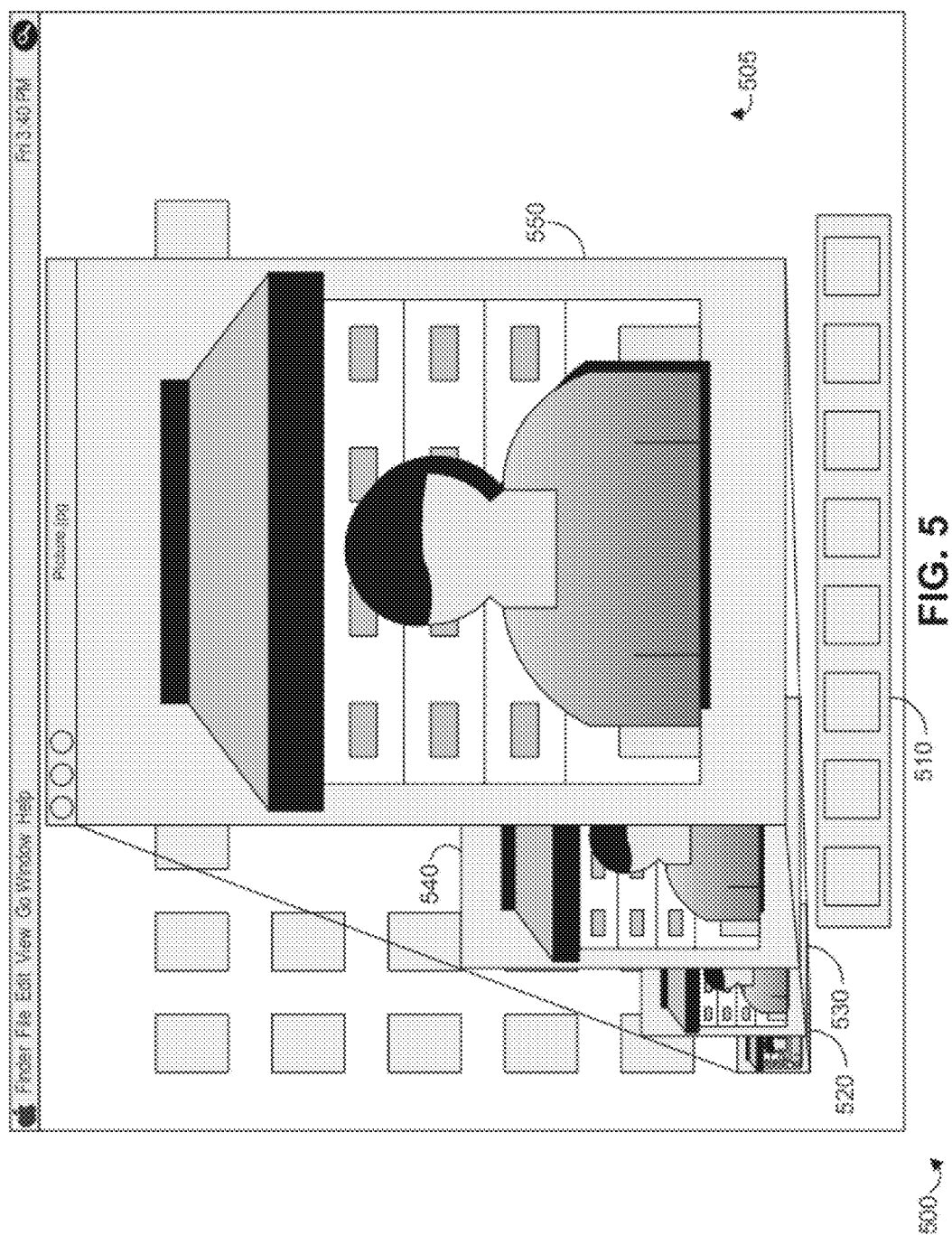
FIG. 5 is a screen shot illustrating an example of a display environment having an object transition.

FIG. 5 is a screen shot illustrating an example of a display environment 500 having an improved application transition. The display environment 500 in this example implementation includes a conventional desktop representation 505. The display environment 500 can also include a conventional dock representation 510. A user can interact with the display environment 500 through the use of various I/O devices (e.g., a mouse, a keyboard, a touch-screen display, a light-pen, etc.).

In some examples, the user can select an application item 520 from a plurality of application items located on the desktop using, for example, a mouse. An operating system 125 can then cause an associated display device display a transition from the selected application item 520 to an application instance representation 550. As discussed above, the application instance representation 550 can be controlled by an application engine 135 through the operating system 125.

The transition of the application item 520 to the application instance representation 550 can include one or more intermediate transition states. For example, FIG. 5 includes two transition states. The transition states include the display of a first copied application item 530 scaled to a first size, and a second copied application 540 item scaled to a second size. The operating system 125 is operable to draw the first copied application item 530 in the first transition state. In the second transition state, the operating system 125 can remove the first copied application item 530 and draw the second copied application item 540. It should be understood that the operating system might not include a separate step to remove the first copied application item 530, but that drawing the second copied application item 540 merely replaces the first copied application item 530. As discussed previously, transition states can be added to slow down the transition, and transition states can be subtracted to speed up the transition. Alternatively, the user or system can set a time, and the number of intermediate transitions and/or motion blurring can be determined based upon the set time for the transition. Additionally or alternatively, the time between transition states can be lengthened to slow the transition, or shortened to speed the transition.

Figure 6:
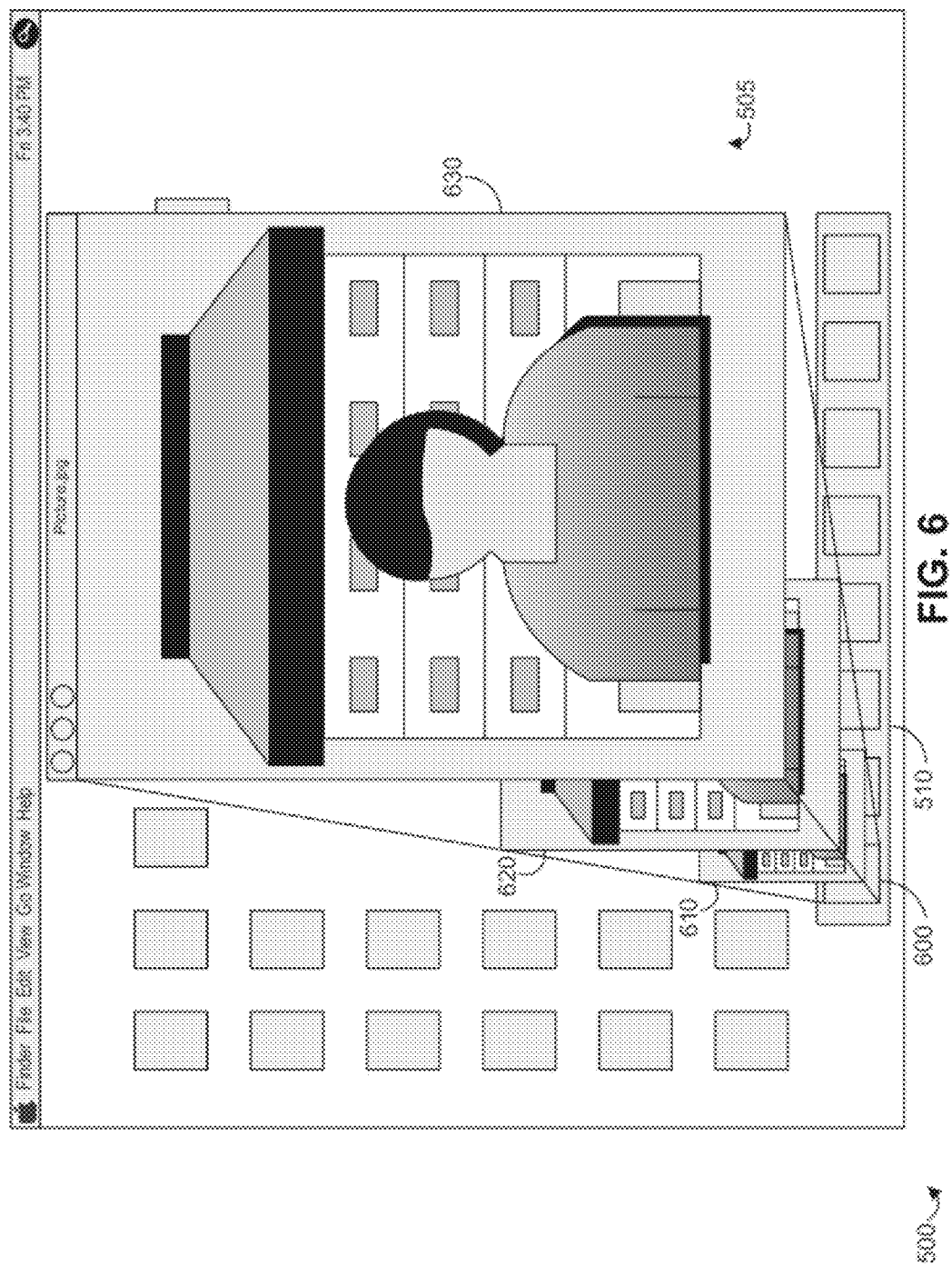
FIG. 6 is a screen shot illustrating another example of a display environment having an object transition.

FIG. 6 is a screen shot illustrating another example of a display environment having an improved application transition. In the example of FIG. 6, an application item 600 among a number of application items is selected from the dock 510. Upon selection of the application item 600, the operating system can retrieve an icon or a file associated with the selected application item 600. The operating system 125 can then render the file in accordance with the associated application and scale the rendering to a first size and display the first scaled rendering 610 in a first transition state. The operating system 125 can then remove the first scaled rendering 610 and scale the rendering to a second size and display the second scaled rendering 620 in a second transition state. In a final transition state, the operating system 125 can render the application instance representation 630 at a predefined size.

Figure 7:
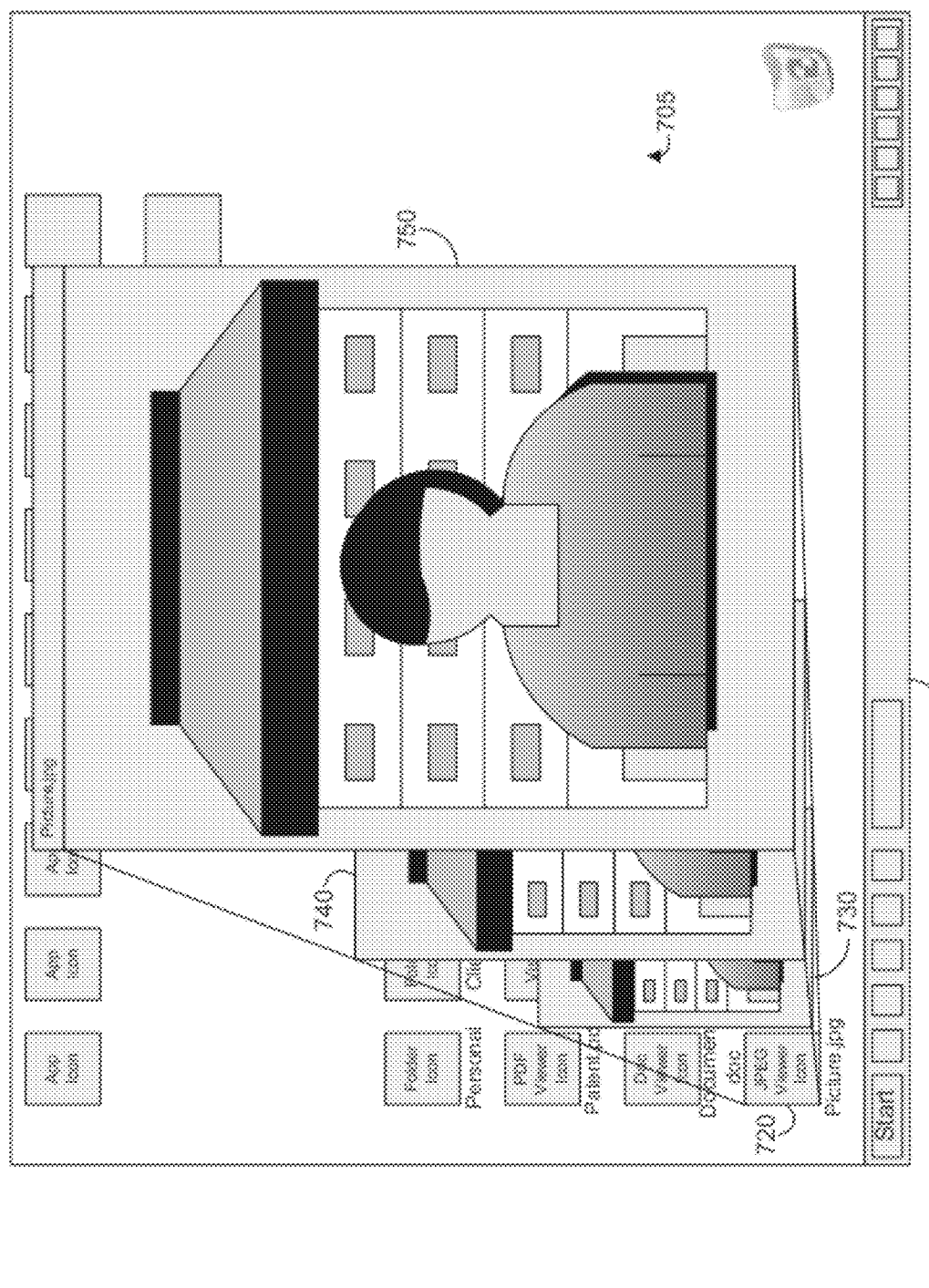
FIG. 7 is a screen shot illustrating another example of a display environment having an object transition.

FIG. 7 is a screen shot illustrating another example of a display environment having an improved application transition. The display environment 700 in this example implementation includes a conventional desktop representation 705. The display environment 700 can also include a conventional task bar representation 710. A user can interact with the display environment 700 through the use of various I/O devices (e.g., a mouse, a keyboard, a touch-screen display, a light-pen, etc.).

In some examples, the user can select an application item 720 from a plurality of application items located on the desktop using, for example, a mouse device. An operating system 125 can then cause an associated display device to display a transition from the selected application item 720 to an application instance representation 750. As discussed above, the application instance representation 750 can be controlled by an application engine 135 through the operating system 125.

The transition of the application item 720 to the application instance representation 750 can include one or more intermediate transition states. For example, FIG. 7 includes two transition states. The transition states include the display of a first copied application item 730 scaled to a first size, and a second copied application 740 item scaled to a second size. The operating system 125 is operable to draw the first copied application item 730 in the first transition state. In the second transition state, the operating system 125 can remove the first copied application item 730 and draw the second copied application item 740. As discussed previously, transition states can be added to slow down the transition, and transition states can be subtracted to speed up the transition. Additionally or alternatively, the time between transition states can be lengthened to slow the transition, or shorted to speed the transition.

Figure 8:
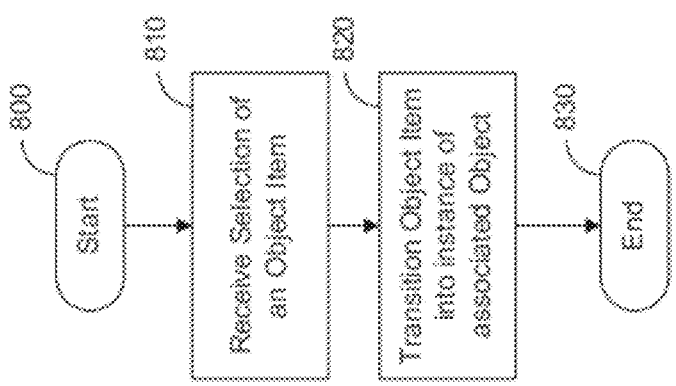
FIG. 8 is a flowchart illustrating an example method for object transitions.

FIG. 8 is a flowchart illustrating an example method for improving application transitions. The method starts at 800. At step 810, a selection of an application item is received. The selection of an application item can be received, for example, using a I/O device interface (e.g., I/O device interface 110 of FIG. 1) in conjunction with drivers included in the operating system for interpreting the input received from the I/O device interface. The application item can be, for example, an icon associated with an application, a file representation associated with an application, a dock representation associated with an application, a taskbar representation associated with an application, etc.

At step 820, the application item is transitioned into an application instance. The transition can be performed for example using the operating system (e.g., operating system 125 of FIG. 1). In some implementations, the transition can be displayed using a display device. The method ends at 830.

Figure 9:
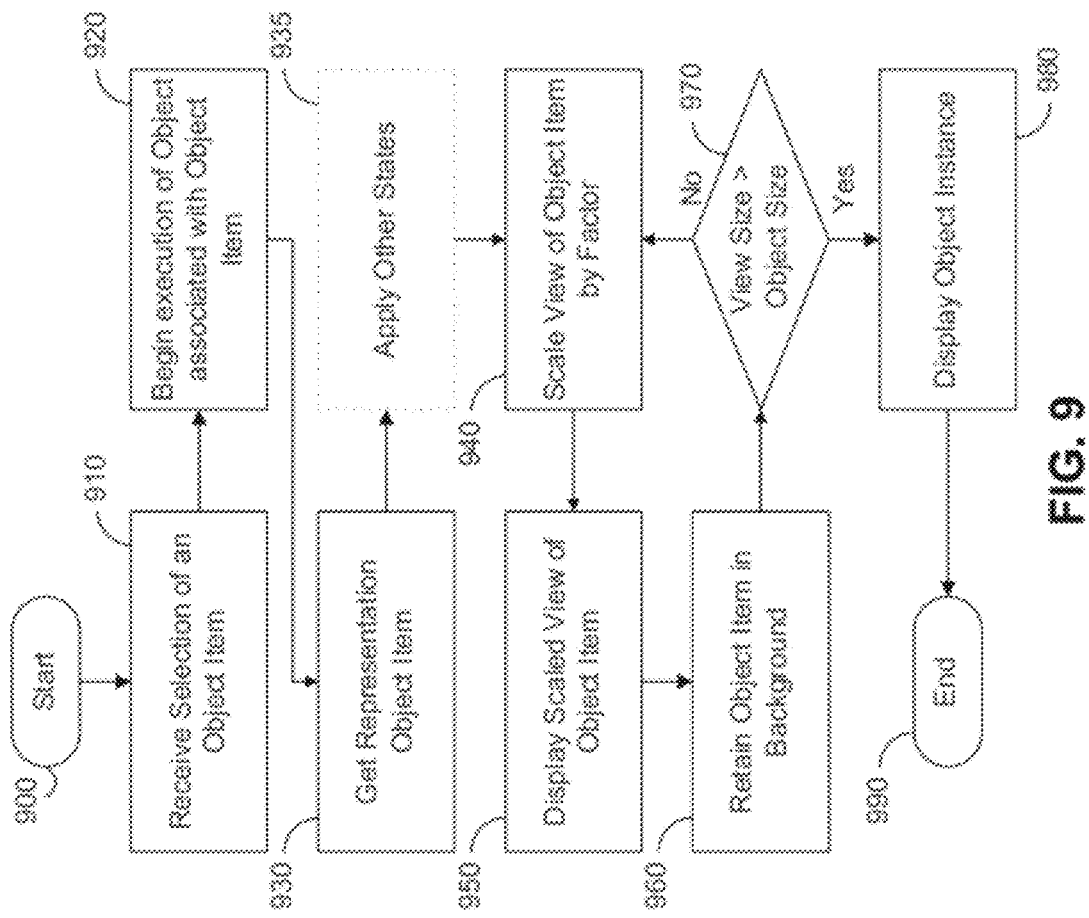
FIG. 9 is a flowchart illustrating another example method for object transitions.

FIG. 9 is a flowchart illustrating another example method for improving application transitions. The method starts at 900. At step 910, a selection of an application item is received. The selection of an application item can be received, for example, using a I/O device interface (e.g., I/O device interface 110 of FIG. 1) in conjunction with drivers included in the operating system for interpreting the input received from the I/O device interface. The application item can be, for example, an icon associated with an application, a file representation associated with an application, a dock representation associated with an application, a taskbar representation associated with an application, etc.

At step 920, execution of an application associated with the selected application item is initiated. Initiation of the application can be performed, for example, by the operating system (e.g., operating system 125 of FIG. 1). The application, for example, can be retrieved from a system data store (e.g., data store 120 of FIG. 1) and executed by a processor (e.g., processing device 105 of FIG. 1).

At step 930, a representation of the object item is retrieved. A representation of the object item can be retrieved, for example, by the operating system (e.g., operating system 125 of FIG. 1). The representation of the object item can be, for example, a representation of the contents of the file (e.g., a video, audio, text, etc.). At step 935, other states are applied. Other states can be applied, for example, by an operating system (e.g., operating system 125 of FIG. 1). Other states can include, for example, animations which can provide a user with notification of, among others, that the contents of the file are being transformed in some way, such that the representation that the user is viewing is a transformation of the data associated with the file. In some implementations, the animation can include a lock and key animation indicating that the data is being decrypted. In other implementations, the animation can indicate that the data is being converted to a new format because the native format is not supported by the system. Other states are possible.

At step 940, the view of the object item representation is enlarged by a factor. In some alternative examples, a graphic associated with the object item can be identified by the operating system and used in conjunction with presenting the transition. In one example, step 940 can be performed by an engine associated with an operating system (e.g., operating system 125 of FIG. 1). The factor by which the view of the object item representation is enlarged can be preset. In other examples, the factor can be determined based upon a user preference for a transition rate.

The enlarged view of the object item representation is sent to a display device at step 950. Step 950 can be performed, for example, by the operating system (e.g., operating system 125 of FIG. 1) using a display device interface (e.g., display device interface 115 of FIG. 1). The display, for example, can be a monitor associated with the computing device (e.g., device 100 of FIG. 1). The object item is retained in the background in step 960. Step 960 can be performed, for example, by an operating system (e.g., operating system 125 of FIG. 1) using a display device interface (e.g., display device interface 115 of FIG. 1).

The view size is compared to a preset object size in step 970. The comparison can be performed, for example, by an operating system (e.g., operating system 125 of FIG. 1) in conjunction with a processing device (e.g., processing device 105 of FIG. 1). If the view size is less than the preset object size, the view size is enlarged by a factor at step 940. The view size thereby continues to be increased until it is greater than the preset object size. When the view size is greater than the pre-set object size, the object instance is displayed at step 980. Step 980 can be performed, for example, by the operating system (e.g., operating system 125 of FIG. 1) using the display device interface (e.g., display device interface 115 of FIG. 1). The method ends at step 990 with the continued execution of the object.

Figure 10:
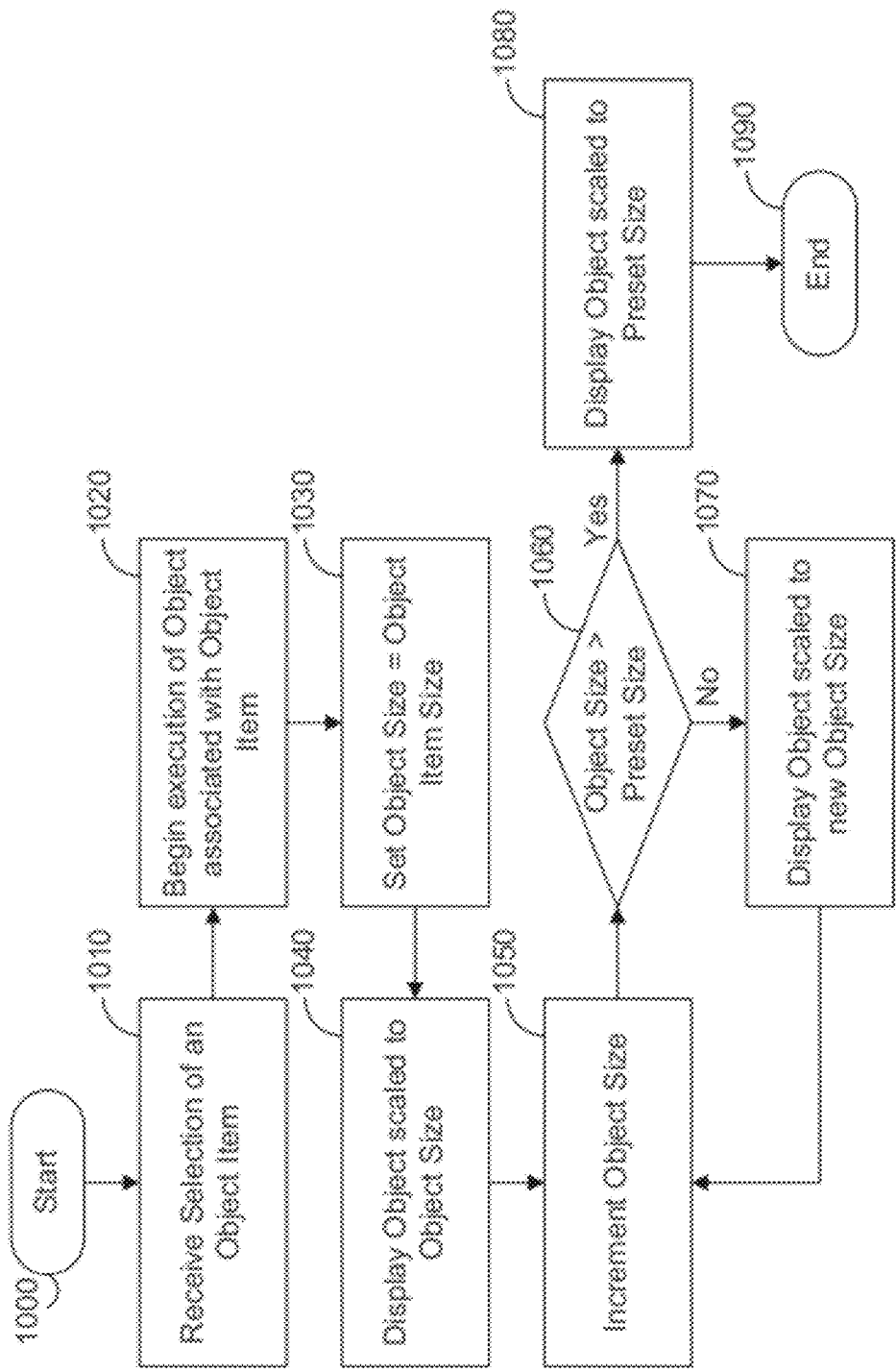
FIG. 10 is a flowchart illustrating another example method for object transitions.

FIG. 10 is a flowchart illustrating an example method for displaying object transitions. The method starts at 1000. At step 1010, a selection of an object item is received. The selection of an object item can be received, for example, using a I/O device interface (e.g., I/O device interface 110 of FIG. 1) in conjunction with drivers included in the operating system for interpreting the input received from the I/O device interface. The object item can be, for example, an icon associated with an object, a file representation associated with an object, a dock representation associated with an object, a taskbar representation associated with an object, etc.

At step 1020, execution of an object associated with the selected object item is initiated. Execution of the object can be initiated, for example, by the operating system (e.g., operating system 125 of FIG. 1).

The object instance representation is scaled to a predetermined size (e.g., the size of the object item) at step 1030. Step 1030 can be performed, for example, by the operating system (e.g., operating system 125 of FIG. 1). At step 1040, the object instance representation is displayed to the user at the predetermined size (e.g., at the size of the object item). The display of the object instance representation can be performed, for example, by the operating system (e.g., operating system 125 of FIG. 1) using a display device interface (e.g., display device interface 115 of FIG. 1). At step 1050, the scaled version of the object instance representation is determined and initiated. In one example, step 1050 can be performed by an engine associated with an operating system (e.g., operating system 125 of FIG. 1). The increment by which the object item is enlarged can be preset. In other examples, the factor can be determined based upon a user preference for a transition rate.

At step 1060, the object size is compared to a preset size. The comparison can be performed, for example, by an operating system (e.g., operating system 125 of FIG. 1) in conjunction with a processing device (e.g., processing device 105 of FIG. 1). The object instance representation is sent to a display device at step 1070. Step 1070 can be performed, for example, by the operating system (e.g., operating system 125 of FIG. 1) using a display device interface (e.g., display device interface 115 of FIG. 1). The display, for example, can be a monitor associated with a computing device (e.g., device 100 of FIG. 1).

The object size continues to be incremented at step 1050 until the object size is greater than or equal to a preset object size. When the size of the object instance representation is greater than or equal to the preset size, the object instance representation is scaled to be equal to the preset object size and sent to a display at step 1080. Step 1080 can be performed, for example, by the operating system (e.g., operating system 125 of FIG. 1) using the display device interface (e.g., display device interface 115 of FIG. 1). The method ends at step 990 with the continued execution of the object.

While the above implementations have been described in terms of operation upon a single platform, other implementations can include transitions across multiple platforms. For example, a user can send an object from a computer to a mobile communications device, a settop device (e.g., a cable box), or some other computing device. In such examples, the transitions described in this application can provide users with visible cues between the object across platforms, thereby enhancing the logical link between an object item representation and an object instance.

The systems and methods disclosed herein may use data signals conveyed using networks (e.g., local area network, wide area network, internet, etc.), fiber optic medium, carrier waves, wireless networks, etc. for communication with one or more data processing devices (e.g., media systems). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A method comprising:
   receiving a selection of an executable object in a three-dimensional display environment, the three-dimensional display environment comprising one or more surfaces the appearance of which forms a three-dimensional visual effect, wherein at least one of the one or more surfaces includes a dock representation that appears to be on a plane that extends away from the user, the executable object having a first appearance of being placed in a foreground away from any surface of the three-dimensional display environment;
   in response to the selection, moving the executable object into a surface from the foreground of the three-dimensional display environment, such that the executable object has a second appearance of being attached to at least one of the one or more surfaces, wherein during movement of the executable object, the executable object is scaled in size through a plurality of intermediate successive transition states; and
   when the scaled executable object reaches a size threshold, replacing the executable object using an object item that is associated with the executable object wherein the scaling is completed with the object item.

2. The method of claim 1, wherein the object item comprises a scaled version of a file represented by the object item.

3. The method of claim 1, comprising, upon completion of the scaling, providing a highlight for the object item.

4. The method of claim 1, wherein each successive transition state comprises a smaller version of a copy of the object item or a smaller version of an instance of the executing object than previous transition states.

5. The method of claim 1, wherein scaling the object item in size comprises scaling an instance of the executable object to a size of an instance of the object item associated with the executable object.

6. The method of claim 1, wherein the object item comprises one or more of an object icon, a customized icon, or a dock item.

7. The method of claim 1, wherein a rate of scaling the object item in size is adjustable based upon user input.

8. The method of claim 7, wherein the rate is adjusted by increasing or decreasing a number of transitions between the object item and a full-size instance of the executing object.

9. The method of claim 8, wherein the rate is adjusted by increasing or decreasing a period between successive transitions between the object item and a full-size instance of the executing object.

10. A method performed by one or more computers, comprising:
    receiving, from a user, a selection of an object item in a three-dimensional display environment, the three-dimensional display environment comprising one or more surfaces the appearance of which forms a three-dimensional visual effect, wherein at least one of the one or more surfaces includes a dock representation that appears to be on a plane that extends away from the user, the object item being associated with an executable object and having a first appearance of being attached to one of the one or more surfaces;
    in response to the selection, moving the object item away from the surface to a foreground of the three-dimensional display environment, such that the object item has a second appearance of not being attached to any surface of the one or more surfaces, wherein during movement of the object item, the object item is scaled in size through a plurality of intermediate successive transition states; and
    when the scaled object item reaches a threshold, replacing the object item using an instance of the executable object wherein the scaling is completed with the instance of the executable object.

11. The method of claim 10, wherein at least one of the one of the one or more surfaces has an appearance of a wall, a floor, or a ceiling.

12. The method of claim 10, wherein each successive transition state comprises a larger version of a copy of the object item or a larger version of an instance of the executing object than previous transition states.

13. The method of claim 10, wherein the object item comprises one or more of an object icon, a customized icon, or a dock item.

14. The method of claim 10, wherein a rate of scaling the object item in size is adjustable based upon user input.

\* \* \* \* \*